US008619276B2

(12) United States Patent
Nishiguchi

(10) Patent No.: US 8,619,276 B2
(45) Date of Patent: Dec. 31, 2013

(54) ELECTRONIC DOCUMENT MANAGEMENT DEVICE, ELECTRONIC DOCUMENT MANAGEMENT METHOD, RECORDING MEDIUM RECORDING ELECTRONIC DOCUMENT MANAGEMENT PROGRAM, AND RECORDING MEDIUM RECORDING PROGRAM FOR CREATING ELECTRONIC DOCUMENT, THE DEVICE HAVING AN ELECTRONIC DOCUMENT STORAGE UNIT THAT INCLUDES A PLURALITY OF BOXES, WHEREIN AN ACCESS RIGHT HAVING A DIFFERENT LEVEL IS ASSIGNED TO EACH OF THE PLURALITY OF BOXES

(75) Inventor: Tomohiro Nishiguchi, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1682 days.

(21) Appl. No.: 11/656,461

(22) Filed: Jan. 23, 2007

(65) Prior Publication Data
US 2008/0037052 A1  Feb. 14, 2008

(30) Foreign Application Priority Data
Aug. 9, 2006 (JP) ................................. 2006-216975

(51) Int. Cl.
G06K 15/00 (2006.01)
(52) U.S. Cl.
USPC ...................................................... 358/1.14

(58) Field of Classification Search
USPC ................................................ 358/1.14, 1.15
See application file for complete search history.

(56) References Cited

U.S. PATENT DOCUMENTS

2006/0048234 A1   3/2006  Imaizumi et al.

FOREIGN PATENT DOCUMENTS

| JP | 2001-325249 A | 11/2001 |
| JP | 2003-114884 | 4/2003 |
| JP | 2005-339273 | 12/2005 |
| JP | 2006-072486 | 3/2006 |
| JP | 2006-134041 | 5/2006 |

OTHER PUBLICATIONS

Notification of Reasons for Refusal in JP 2006-216975 dated Jul. 15, 2008, and English Translation thereof.

Primary Examiner — Jeremiah Bryar
(74) Attorney, Agent, or Firm — Buchanan Ingersoll & Rooney PC

(57) ABSTRACT

An electronic document management device including: an electronic document storage unit that includes a plurality of boxes for storing electronic documents, each box being accessible to a user or a user group having an access right thereto, each of the plurality of boxes storing an electronic document that includes one or more constituent elements, each constituent element being attached with either disclosure-enabled information or disclosure-disabled information depending on a box storing the electronic document; and a modifying unit operable to modify, for each box, each constituent element that is attached with the disclosure-disabled information, so as not to be disclosed.

7 Claims, 21 Drawing Sheets

FIG. 11

SELECT SAVING DESTINATION BOX

DOCUMENT: document001    IMAGE FORMING APPRATUS: 01

| No. | TYPE | ADMINISTRATOR | SAVE |
|-----|---------|---------------|------|
| 1 | PRIVATE | USER 1 | ☑ |
| 2 | PRIVATE | USER 2 | ☐ |
| 3 | GROUP | GROUP A | ☑ |
| 4 | GROUP | GROUP B | ☐ |
| 5 | PUBLIC | ALL | ☑ |

— 96

100

BOX SELECTION END

"DISCLOSURE-ENABLED/DISABLED" INFORMATION TABLE 84

| SELECTED ELEMENT NO. | ALLOCATION AREA | BOX NO. | | | | |
|---|---|---|---|---|---|---|
| | | 1 | 2 | 3 | 4 | 5 |
| 1 | (x1, y1~x2, y2) | ○ | ○ | × | × | × |
| 2 | (x3, y3~x4, y4) | ○ | ○ | × | × | × |
| 3 | (x5, y5~x6, y6) | ○ | × | ○ | × | × |

○···DISCLOSURE-ENABLED, ×···DISCLOSURE-DISABLED

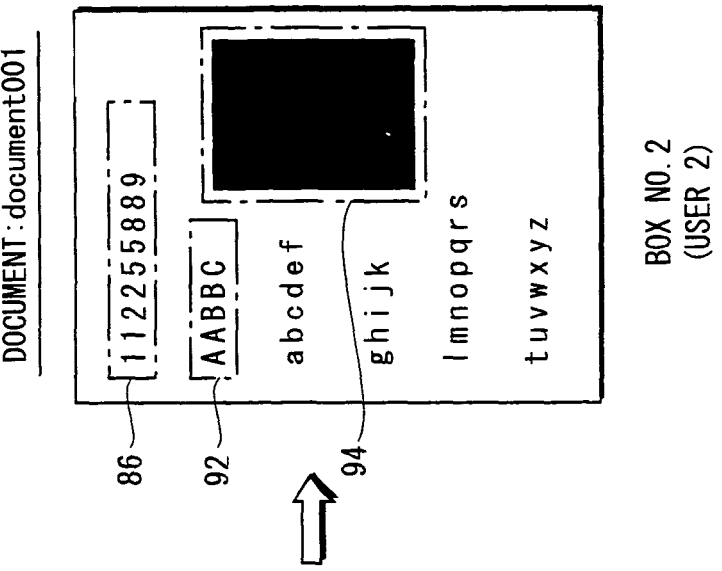
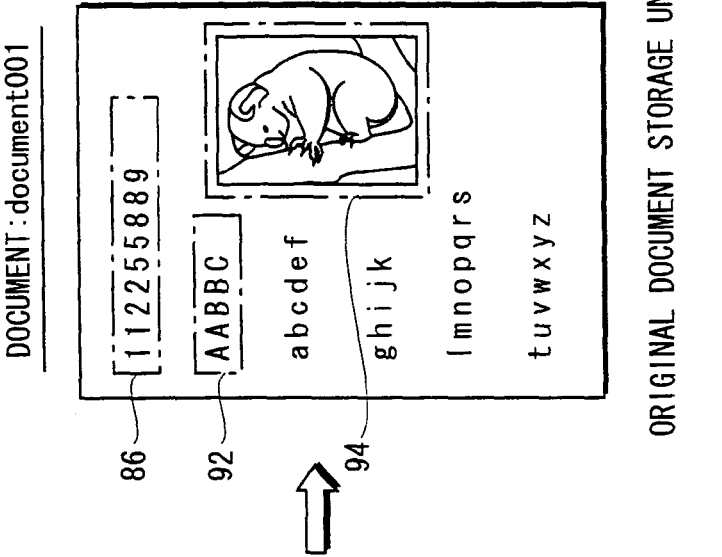
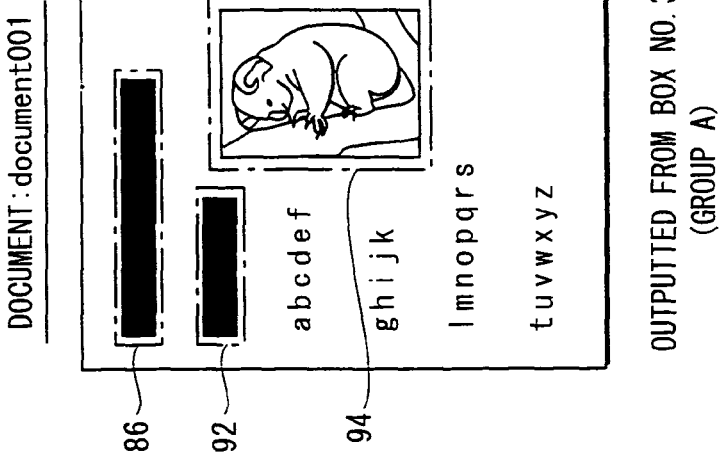

ELECTRONIC DOCUMENT MANAGEMENT DEVICE, ELECTRONIC DOCUMENT MANAGEMENT METHOD, RECORDING MEDIUM RECORDING ELECTRONIC DOCUMENT MANAGEMENT PROGRAM, AND RECORDING MEDIUM RECORDING PROGRAM FOR CREATING ELECTRONIC DOCUMENT, THE DEVICE HAVING AN ELECTRONIC DOCUMENT STORAGE UNIT THAT INCLUDES A PLURALITY OF BOXES, WHEREIN AN ACCESS RIGHT HAVING A DIFFERENT LEVEL IS ASSIGNED TO EACH OF THE PLURALITY OF BOXES

This application is based on an application No. 2006-216975 filed in Japan, the contents of which are hereby incorporated by reference.

BACKGROUND OF THE INVENTION (1) Field of the Invention

The present invention relates to an electronic document management device and the like, and specifically to a management device and the like that manage the security of electronic documents.

(2) Description of the Related Art

In recent years, as an increasing number of image forming apparatuses have become multi-functional to have functions such as scanning, copying, printing, and faxing, there have appeared image forming apparatuses equipped with a storage device such as a hard disk drive. Some of such image forming apparatuses have a function to temporarily store a received electronic document in the storage device, not automatically outputting the received electronic document onto a recording medium such as paper. That is to say, some image forming apparatuses can function as electronic document management devices.

In general, such an electronic document management device (image forming apparatus) is connected to a network and is shared by a plurality of user terminals via the network. Accordingly, managing the security in relation to the disclosure of the stored electronic document is critical to such an electronic document management device. In one example of conventional security management of electronic documents, a confidential level is assigned to each document file or each folder to restrict the access by users to the file or folder.

Meanwhile, confidential levels of all the constituent elements (such as a drawing, a photograph, and a unit of description) of an electronic document may not necessarily be the same. That is to say, some elements have low confidential levels allowing the elements to be disclosed to all users, while other elements have high confidential levels allowing the elements to be disclosed to only limited users. With this construction, the confidential level of the whole electronic document should be the same as the highest confidential level for the constituent elements. In this case, however, the elements with the low confidential levels, which can be disclosed to all users, are not disclosed. This is problematic from the viewpoint of using electronic documents effectively.

One may think that the problem would be solved if a worker selects constituent elements with low confidential levels among those of an original electronic document, creates another electronic document by the selected elements, and assigns a low confidential level to the newly created electronic document. However, it takes a lot of effort for the worker to create an electronic document for each confidential level.

Japanese Patent Application Publication No. 2001-325249 discloses a document management device aimed to solve the above-described problem. The document management device of this publication sets confidential levels in units of constituent elements of the electronic documents. When a user attempts to access a document, the document management device compares the confidential level (access-right level) of the user with the confidential levels of each constituent element, and judges, for each constituent element, whether or not the constituent element can be disclosed to the user. The document management device then discloses an electronic document to the user by printing or the like, after replacing contents of the constituent elements, which were judged not to be disclosed to the user, with turned letters or the like.

With the above-described construction, the worker need not create an electronic document for each confidential level, realizing an effective use of electronic documents.

However, the document management device disclosed in Japanese Patent Application Publication No. 2001-325249 still has the following problem.

Suppose that User H has a high-level access right while User L has a low-level access right, and these two people are discussing business over phone while respectively seeing electronic documents created from one source stored in the document management device. In this case, the entire document is disclosed to User H, whereas only part of the document is disclosed to User L, with the remaining part concealed. When this happens, User H cannot know which part of the document is visible to User L, and thus may accidentally disclose some contents of the turned-letter portion (namely, a portion having high confidential level). This may result in leakage of the confidential information. Such an occurrence would be prevented if User H has the same electronic document as disclosed to User L. However, to realize it, User H might request User L to send the electronic document to User H, for example. This is inconvenient.

SUMMARY OF THE INVENTION

It is therefore an object of the present invention to provide an electronic document management device and the like that can solve the above-described inconvenience.

The above-mentioned object is fulfilled by an electronic document management device comprising: an electronic document storage unit that includes a plurality of boxes for storing electronic documents, each box being accessible to a user or a user group having an access right thereto, each of the plurality of boxes storing an electronic document that includes one or more constituent elements, each constituent element being attached with either disclosure-enabled information or disclosure-disabled information depending on a box storing the electronic document; and a modifying unit operable to modify, for each box, each constituent element that is attached with the disclosure-disabled information, so as not to be disclosed.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 11 shows an example of a screen displayed on the liquid crystal display during the saving box selection process;

FIG. 12 shows a disclosure-enabled/disabled information table attached to an electronic document;

FIGS. 21A to 21C show examples of results of the transfer/copy process.

DESCRIPTION OF THE PREFERRED EMBODIMENT

Hereinafter, description will be made on a preferred embodiment of the present invention by referring to the accompanying drawings.

<Configuration of Electronic Document Management System>

Figure 1:
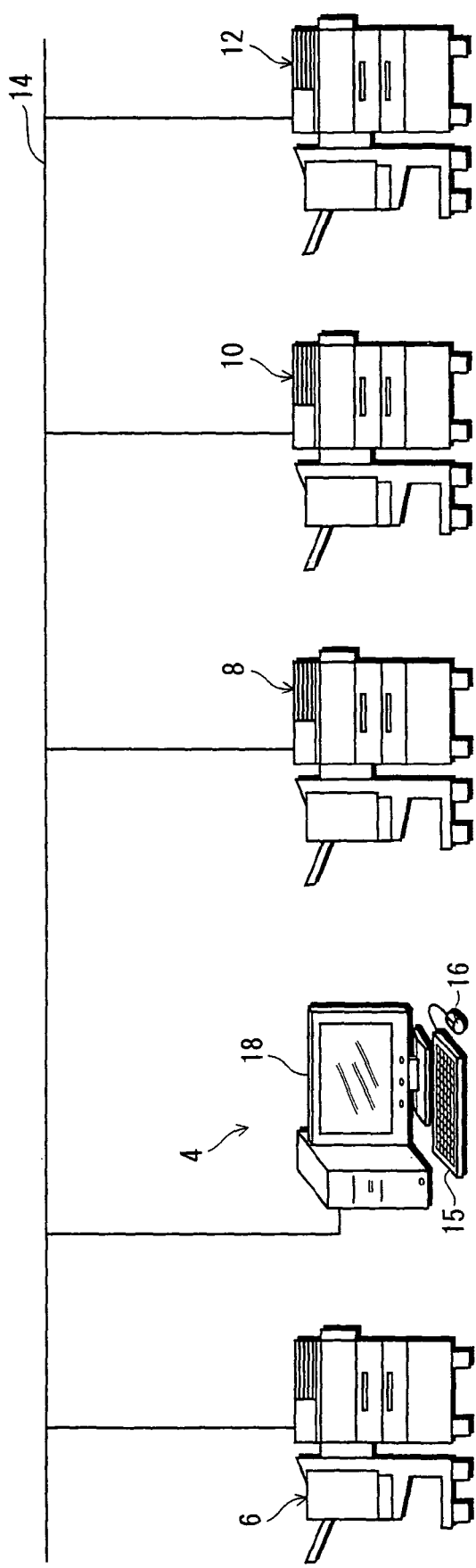
FIG. 1 shows an outlined configuration of an electronic document management system.

Reference will now be made to FIG. 1, in which the configuration of an electronic document management system 2 is shown.

The electronic document management system 2 includes a terminal device 4 and four image forming apparatuses 6, 8, 10, 12, where these constituent elements are connected to each other via a LAN (Local Area Network) 14. Here, the number of terminal devices constituting the management system 2 is not limited to one, but a plurality of terminal devices 4 may be provided. Also, the number of the image forming apparatuses is not limited to two or more (in this example, four), but may be one. Also, the network connecting the terminal device 4 and the image forming apparatuses 6, 8, 10, 12 is not limited to LAN, but may be a network using a general line or wireless communication.

The terminal device 4 is achieved by a general personal computer that includes a CPU as a control unit, a RAM as a temporary storage means, a hard disk drive as a fixed memory device (the constituent elements up to now are not illustrated), a keyboard 15 and a mouse 16 as input means, and a liquid crystal display (LCD) 18 as a display means.

The image forming apparatuses 6, 8, 10, 12 are each an apparatus that is generally called an MFP (Multi Functional Peripheral), and includes the following functions: reading an image of an original document set on a document table using a scanner, and reproducing the read image onto recording paper by the electrophotography; receiving an electronic document from the terminal device 4, and printing an image onto recording paper based on the received electronic document; or reading an image of an original document set on a document table in accordance with an instruction from the terminal device 4, and transmitting an electronic document obtained as a result of this reading to the terminal device 4.

Now, reference will be made to FIG. 2, in which a block diagram of the image forming apparatus 6 is shown. Note that since the configurations of the image forming apparatuses 6, 8, 10, 12 are the same, the image forming apparatus 6 will be described as a representative of them in the following description.

The image forming apparatus 6 includes a control unit 20. The control unit 20 includes a CPU 22 as a main element. The control unit 20 further includes a ROM 24 storing therein a computer program, an S-RAM (Static Random Access Memory) 26 for work use, and an NV-RAM (Nonvolatile Random Access Memory) 28 that is battery-backed-up and stores various set values relating to the image formation and the like, where these constituent elements are connected to the CPU 22 via a bus 30.

Connected to the control unit 20 via the bus 30 are: an image reading device 34 for reading a paper document; an operation panel 34 equipped with a display unit and a plurality of keys for various kinds of inputs; a network interface 36 for transmitting and receiving various kinds of information to/from the terminal device 4 connected via the LAN 14; and a printer 38 for forming an image of an electronic document onto paper.

Now, reference will be made to FIG. 3, in which a plan view of the operation panel 34 is shown.

The operation panel 34 is provided with an LCD touch panel 58 and a plurality of keys for various purposes.

Figure 4:
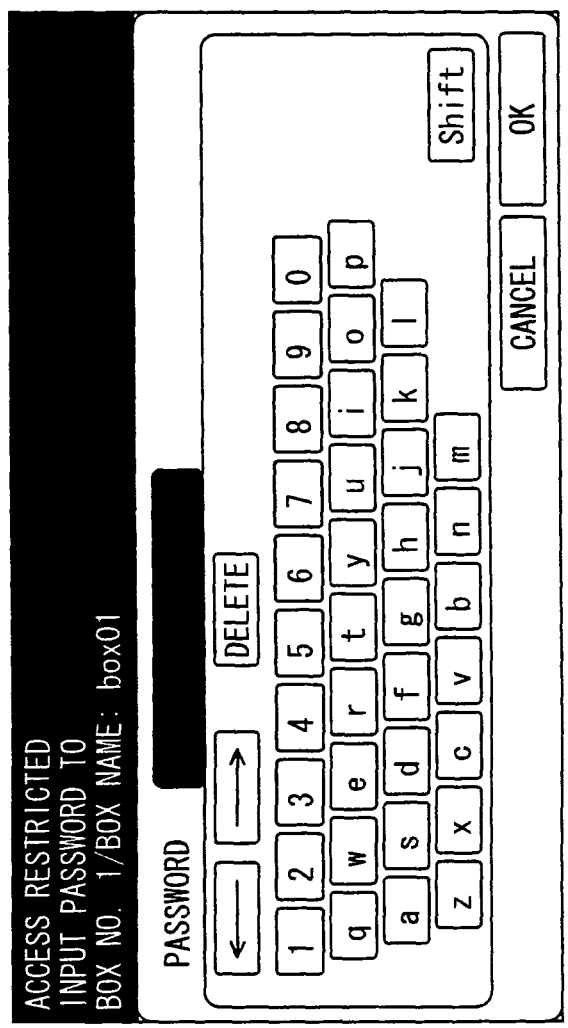
FIG. 4 shows an example of a display of a liquid crystal touch panel provided in the operation panel.

Displayed on the touch panel 58 are copy conditions and copy modes having been set, keys for selecting copy conditions and copy modes, and a message notifying running out of paper, a paper jam or the like. The touch panel 58 also displays a keyboard screen as shown in FIG. 4 for receiving input of a user ID or a password, as will be described later.

Figure 3:
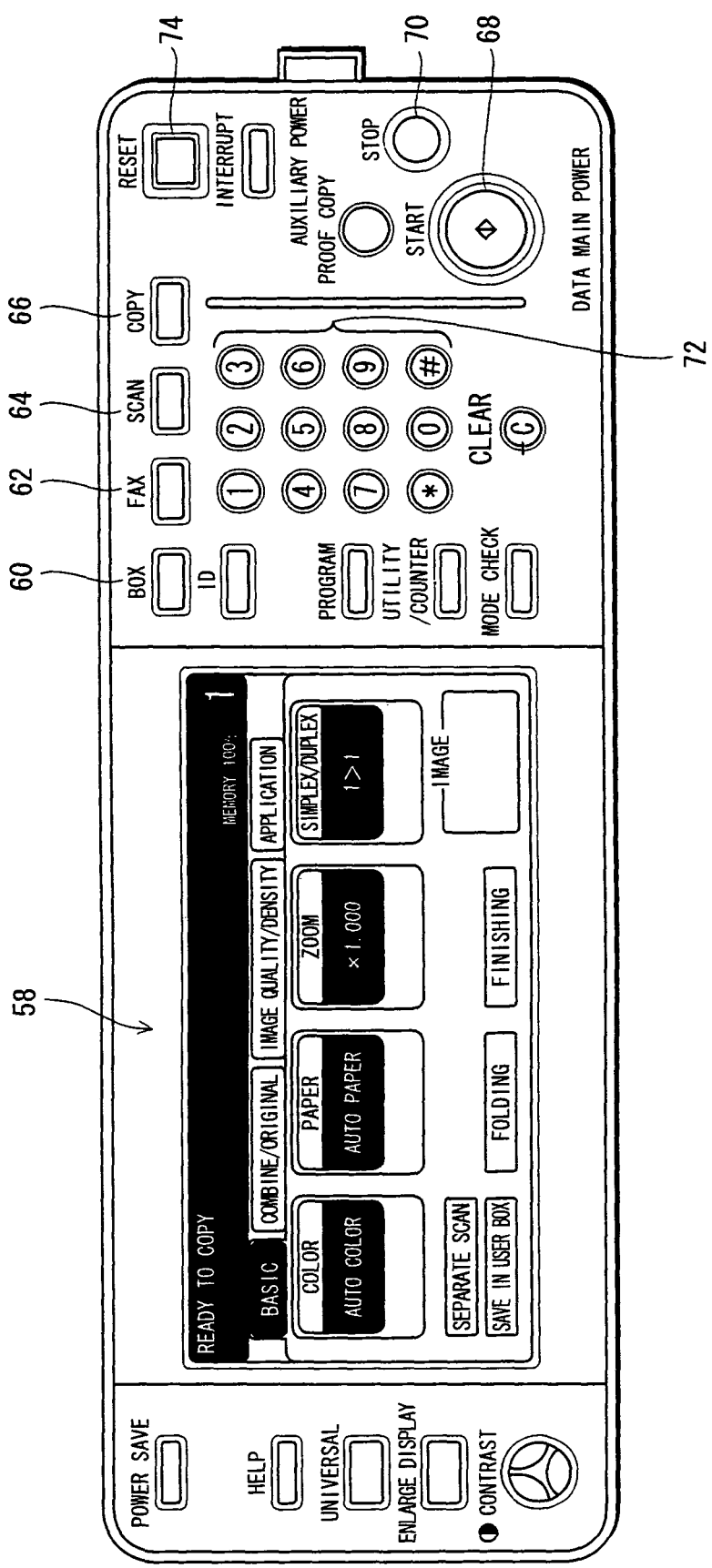
FIG. 3 is a plan view of an operation panel provided in the image forming apparatus.

Back to FIG. 3, the keys for various purposes include: a BOX key 60; a FAX key 62; a SCAN key 64; a COPY key 66, which are pressed for switching between various functions; a START key 68 pressed for starting a copy or other functions; a STOP key 70 for stopping an operation of the device; a numeric keypad 72 including keys pressed for entering numerical values representing the number of copies or the like; and a RESET key 74 pressed for resetting the settings that have been made using the touch panel 58 and/or the keys. It should be noted here that the "box" will be explained later.

Figure 2:
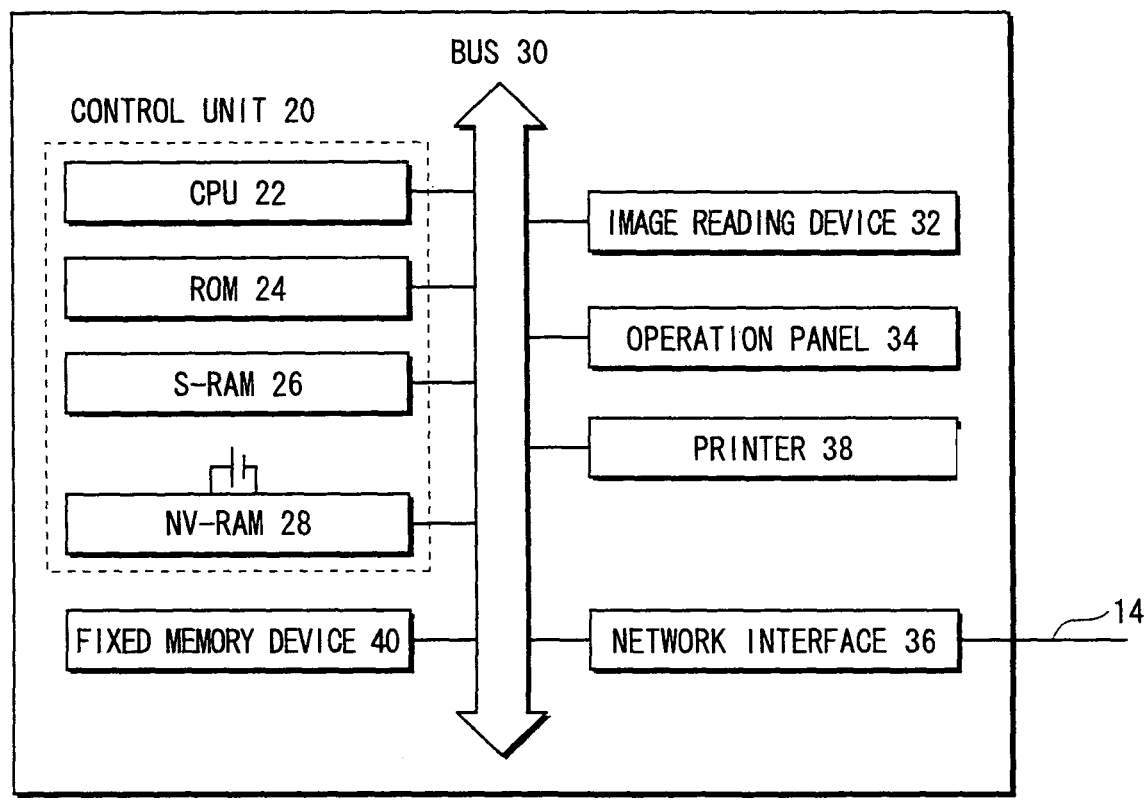
FIG. 2 is a functional block diagram of an image forming apparatus.

Back to FIG. 2, the control unit 20 is connected to a fixed memory device 40 via the bus 30. The fixed memory device may be achieved by, for example, a hard disk drive.

Figure 5:
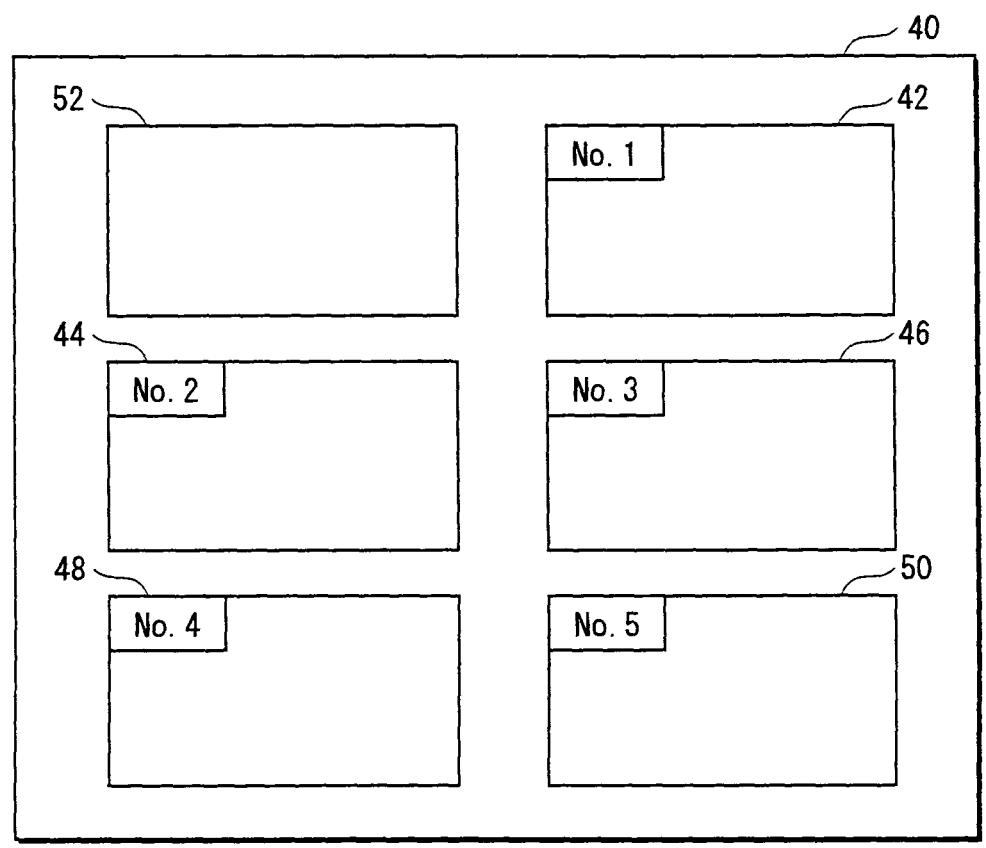
FIG. 5 is a conceptual diagram of storage areas provided in a fixed memory device of the image forming apparatus.

The fixed memory device 40 includes, as shown in FIG. 5, a plurality of (in this example, five) "boxes" that are segmented storage areas. The boxes are used as electronic document storage areas. That is to say, the fixed memory device 40 functions as an electronic document storage unit for storing electronic documents.

The boxes are identified and managed by the use of box numbers (No.).

The box is classified into three types: a private box that is assigned to an independent user; a group box that is assigned to a specific user group; and a public box that is assigned to all users who are permitted to log in the image forming apparatus 6. In the examples shown in FIG. 5, the boxes 42 and 44 are private boxes, the boxes 46 and 48 are group boxes, and the box 50 is a public box.

The fixed memory device 40 is provided with an access management information storage unit 52 for storing therein management information that is used for managing accesses to the image forming apparatus 6, private boxes, and group boxes.

Figure 6A:
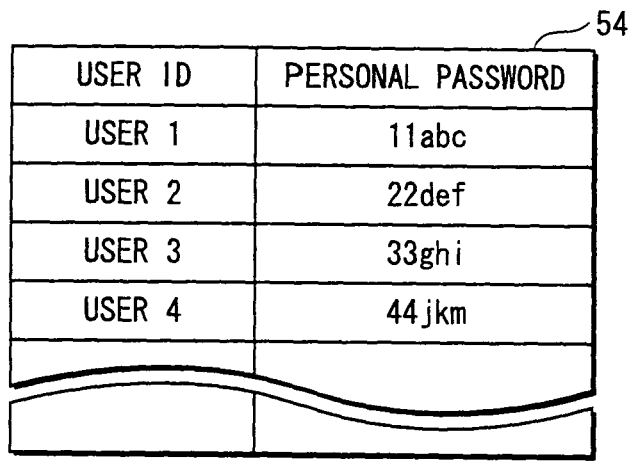
FIG. 6A shows the first table contained in an access management information storage unit.
Figure 6B:
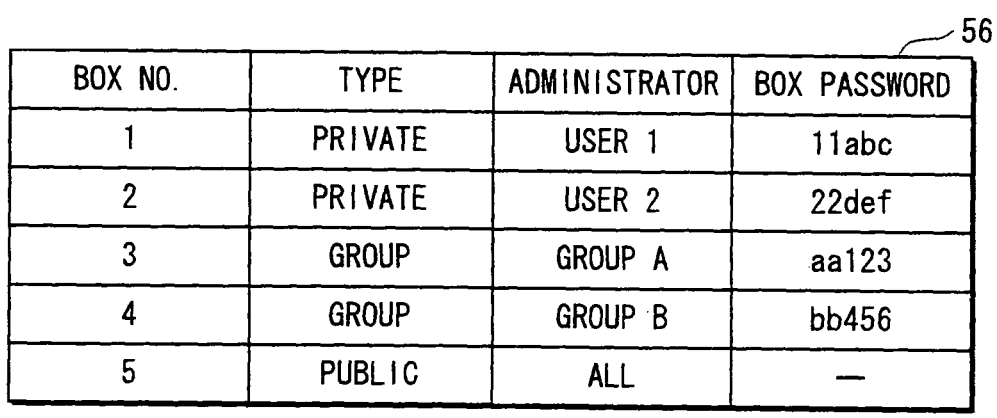
FIG. 6B shows the second table contained in the access management information storage unit.

The access management information storage unit 52 includes a first table 54 and a second table 56. As shown in FIG. 6A, user IDs and personal passwords are stored in the first table 54 in correspondence with each other; and as shown in FIG. 6B, box numbers, box types, box administrators, and box passwords are stored in the second table 56 in correspondence with each other.

When a user attempts to access the image forming apparatus 6, the user is requested to input a user ID and a personal password that are uniquely assigned to the user. Then, only if the input user ID and personal password have been registered with the first table 54, the user is permitted to log in the image forming apparatus 6.

When the user, who was permitted to log in the image forming apparatus 6, attempts to access a group box, the user is requested to input a box password. Then, only if the input box password matches a box password that has been registered with the second table 56, the user is permitted to access the group box.

It should be noted here that a user having been assigned with a private box can access the private box without inputting a box password. This is because the box password of the private box is identical with the personal password.

No box password is assigned to the public box, and all the users having been permitted to log in the image forming apparatus 6 can access the public box.

As described above, the image forming apparatus 6 is provided with the fixed memory device 40 as a document storing unit. The fixed memory device 40 includes boxes for storing documents, where a different level of access right (and a different password, for example) is assigned to each type of box. Accordingly, the image forming apparatus 6 functions as a management device for managing electronic documents (namely, as an electronic document management device). It should be noted here that creation or deletion of a box, and setting a password for a box can be performed via the operation panel 34.

It is presumed here that:

User 1 belongs to Group A and has been informed of personal password "11abc" and of box password "aa123" of Box No. 3;

User 2 belongs to Group B and has been informed of personal password "22def" and of box password "bb456" of Box No.4;

User 3 belongs to Group A and has been informed of box password "aa123" of Box No.3; and User 4 belongs to Group B and has been informed of box password "bb456" of Box No.4.

<Setting Disclosure Restriction for Electronic Document and Storing Electronic Document into Box>

With respect to electronic documents stored in the above-described boxes, disclosure-enabled/disabled information is attached to each constituent element of the electronic documents. The disclosure-enabled/disabled information is classified into two types: "disclosure-enabled" and "disclosure-disabled". For example, it is presumed here that a constituent element composed of character string "abc" included in an electronic document is attached with the disclosure-enabled information in box No. 1, and is attached with the disclosure-disabled information in box No. 2, and that the electronic document is stored in both box No. 1 and box No. 2. In this case, the character string "abc" stored in box No. 1 remains the same without any modification, while the character string "abc" stored in box No. 2 is output after it is subjected into a "turned-letter process" in which the character string is converted into an illegible state, by, for example, being painted black.

The following describes a method of creating the above-described electronic documents (method of setting disclosure restriction) with reference to FIGS. 7 to 13.

Figure 7:
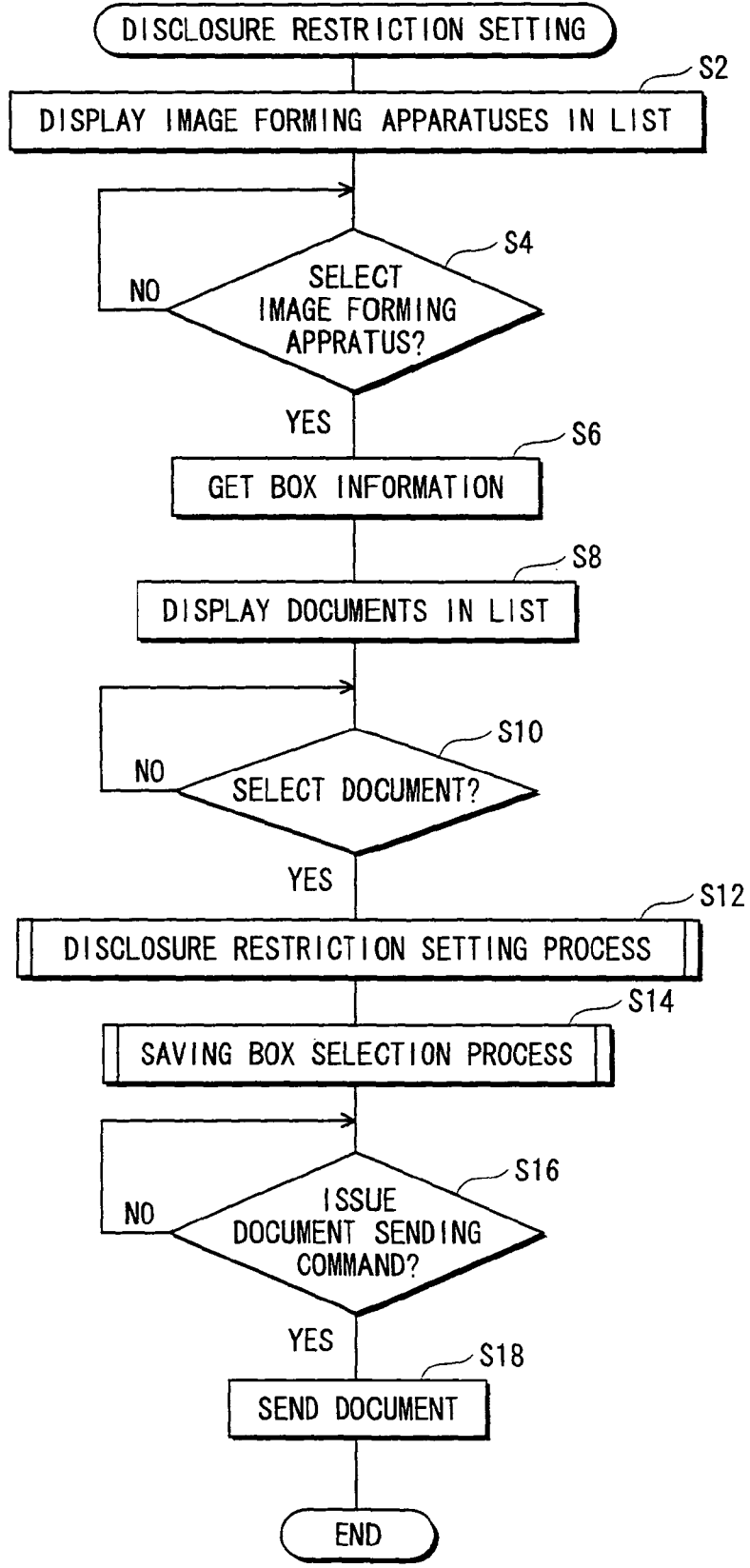
FIG. 7 is a flowchart of a disclosure restriction setting performed by a terminal device.
Figure 8:
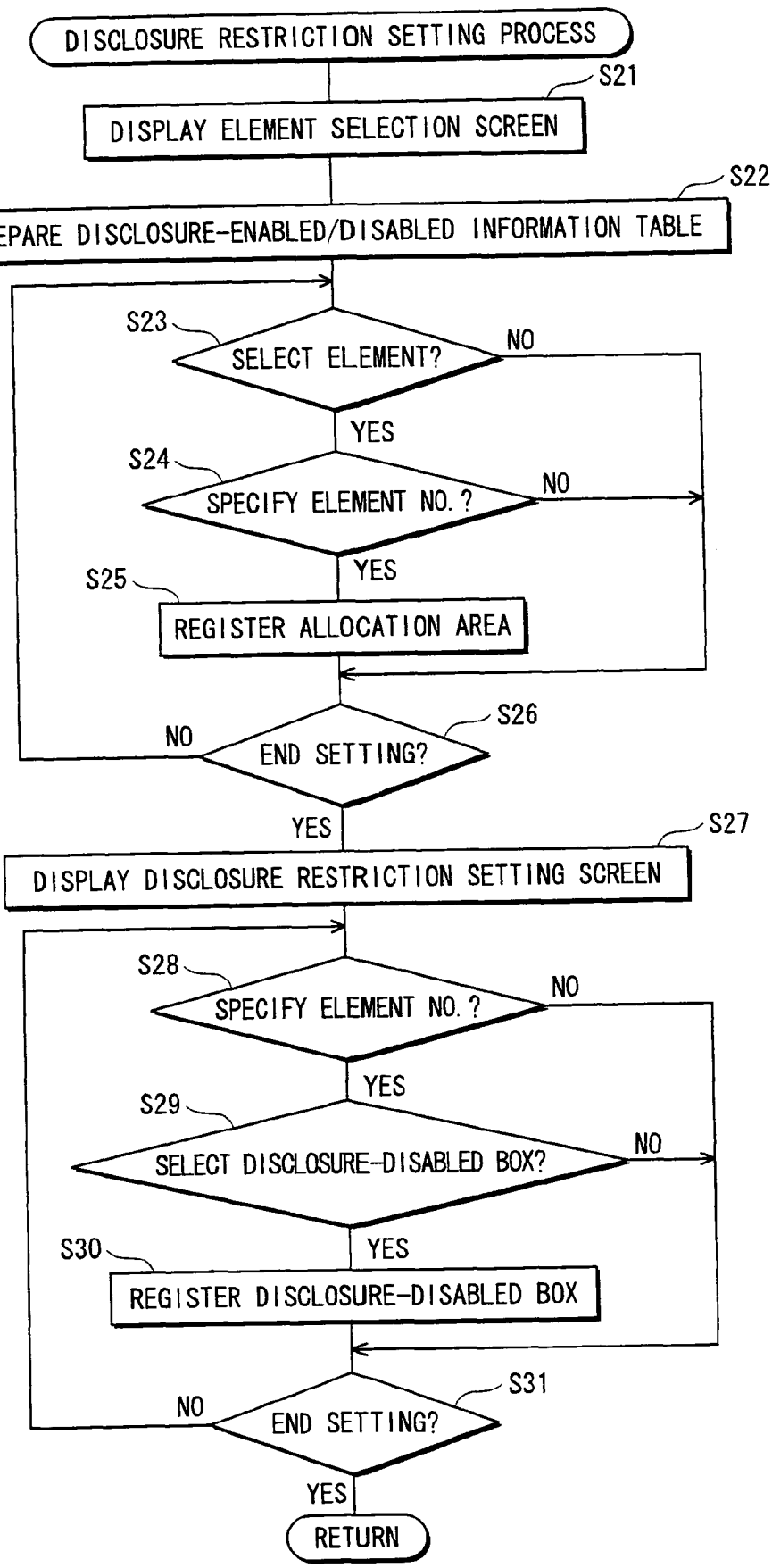
FIG. 8 is a flowchart of a disclosure restriction setting process performed in the disclosure-restriction setting.
Figure 9:
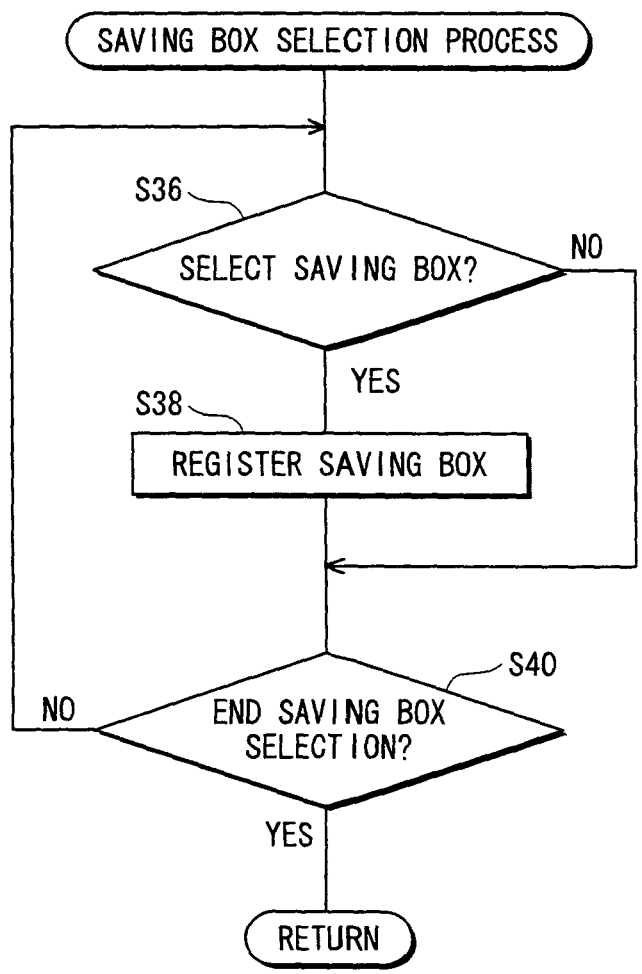
FIG. 9 is a flowchart of a saving box selection process performed in the disclosure restriction setting.

FIGS. 7 to 9 are flowcharts showing the procedures of an application program that is installed and run in the terminal device 4 (FIG. 1).

After the application program is started in the terminal device 4, the terminal device 4 detects image forming apparatuses currently connected to the LAN 14 (FIG. 1), and displays a list of the detected image forming apparatuses on the LCD 18 (step S2). The displayed list is used for selecting an image forming apparatus for storing an electronic document that is to be subjected to the disclosure restriction setting process.

When the user has selected one of the image forming apparatuses from the list (YES in step S4), the terminal device 4 acquires box information from the selected image forming apparatus (step S6). It should be noted here that the "box information" is information including a box number, type, and administrator, among the pieces of information stored in the second table 56 (FIG. 6B) within the image forming apparatus.

The terminal device 4 then displays a list of documents stored therein. The displayed list is used for selecting an electronic document that is to be subjected to the disclosure restriction setting process, and is displayed in the form of file names.

When the user has selected a file name (an electronic document) from the file names displayed as the list, via the mouse 16 (YES in step S10), the disclosure restriction setting process is performed (step S12). It is presumed in this example that the electronic document with file name "document001" is selected.

Here, details of the disclosure restriction setting process (step S12) will be described with reference to FIGS. 8, 10, and 12.

FIG. 8 is a flowchart showing the procedures of the disclosure restriction setting process (step S12). The disclosure restriction setting process is roughly divided into a constituent element reception process (steps S21-S26) and a disclosure-enabled/disabled information registration process (steps S27-S31). In the constituent element reception process, a selection of a constituent element, for which disclosure-enabled or disclosure-disabled is to be set, is received. In the disclosure-enabled/disabled information registration process, for each of the selected constituent elements, the disclosure-enabled/disabled information is registered such that "disclosure-enabled" or "disclosure-disabled" is assigned to each of the boxes.

Figure 10A:
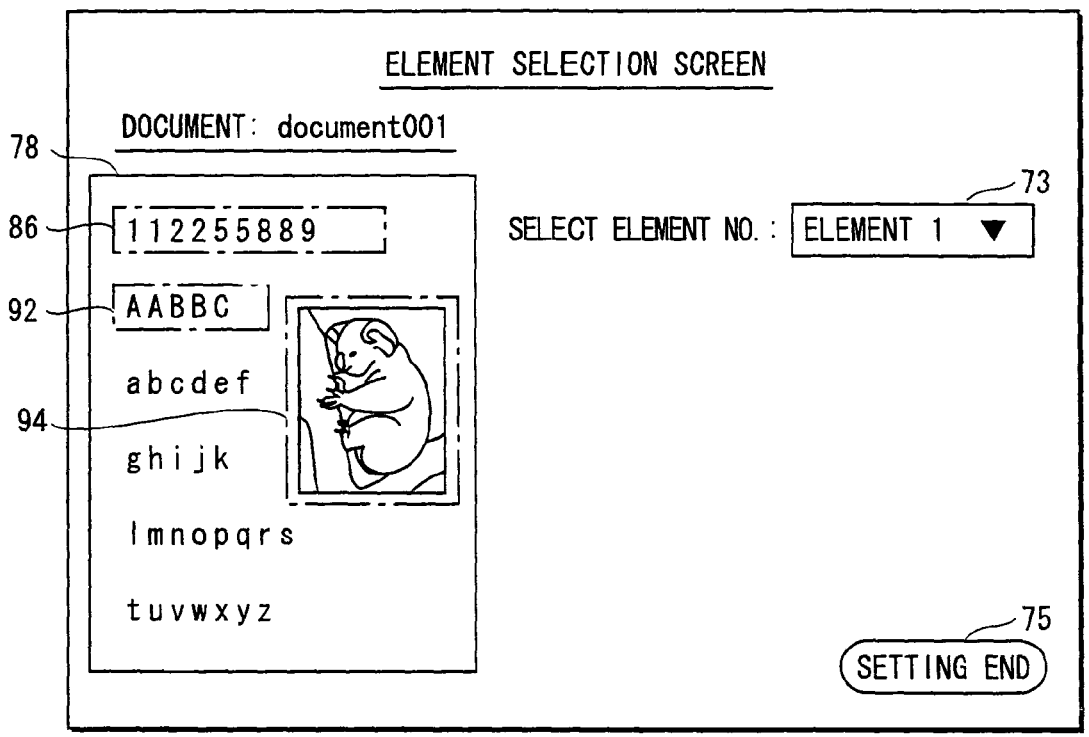
FIGS. 10A and 10B show examples of screens displayed on the liquid crystal display of the terminal device during the disclosure restriction setting process.

First, the terminal device 4 displays an element selection screen 71 as shown in FIG. 10A, on the LCD 18 (step S21), and at the same time, prepares a disclosure-enabled/disabled information table 84 as shown in FIG. 12 in the RAM (not illustrated) (step S22).

This results in the display of the document selected in step S10 (FIG. 7) in a document display area 78 on the element selection screen 71, and, on the right-hand side of the document, a combo box 73 which is used for registering the selected element numbers.

As shown in FIG. 12, the disclosure-enabled/disabled information table 84 includes columns: "SELECTED ELEMENT NO."; "ALLOCATION AREA"; and "BOX NO." that is acquired from the box information.

First, the user inverts the display of an area (constituent element) in the document, for example, an area 86, that the user intends to register, by dragging the mouse 16 (YES in step S23). The user then selects a constituent element number from options of the combo box 73, for example, "ELEMENT 1" (YES in step S24). With this selection of the constituent element (in this example, ELEMENT 1), an allocation area, which has been allocated to the selected constituent element number in the electronic document (in this example, area "x1,y1-x2,y2"), is registered with the disclosure-enabled/disabled information table 84 in correspondence with the selected constituent element (in this example, ELEMENT 1) (step S25). This operation is repeated for each of areas 92 and 94 so that the areas (constituent elements) in the electronic document are correlated with selected constituent element numbers. Upon completion of the correlating process, a SETTING END button 75 is clicked (YES in step S26). With these operations, a correspondence table showing correspondence between the selected element No. and the allocation area of each constituent element is created in the disclosure-enabled/disabled information table 84 (FIG. 12).

Figure 10B:
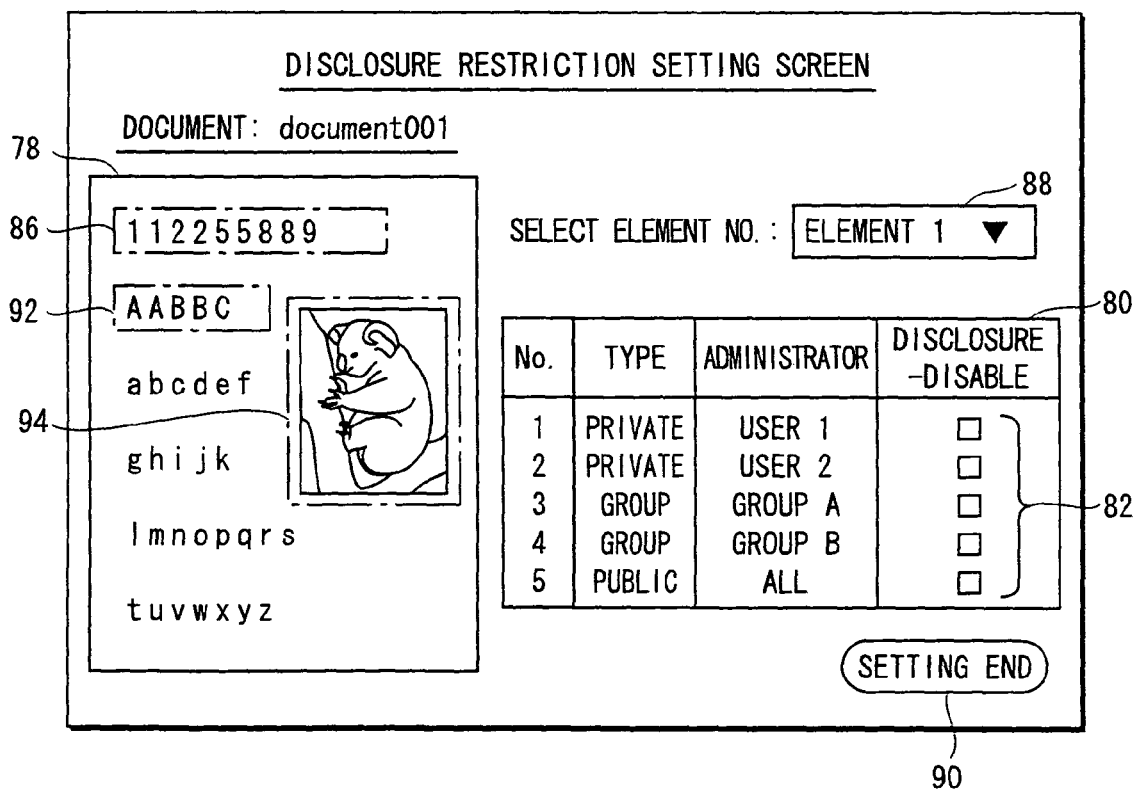

A disclosure restriction setting screen 76, as shown in FIG. 10B, is then displayed. As shown in FIG. 10B, the electronic document selected in step S10 is displayed in the document display area 78 of the disclosure restriction setting screen 76. Also displayed on the disclosure restriction setting screen 76 is a combo box 88 for selecting (specifying) a constituent element. Also, in the disclosure-enabled/disabled setting area 80, checkboxes 82 for setting the disclosure-disabled for each box is displayed, as well as the box information obtained in step S6 (FIG. 7).

When it is confirmed that the user has selected a constituent element (element number) from options of a combo box 88 (YES in step S28), the disclosure-enabled/disabled information table 84 (FIG. 12) is referred to, and the constituent element that is present in an area corresponding to the selected element number is, for example, displayed inverted (not illustrated) so that the constituent element can be distinguished from the other constituent elements.

When any of the checkboxes 82 in the disclosure-enabled/disabled setting area 80 are checked by the user via the mouse 16 (YES in step S29), the sign "X" representing disclosure-disabled is written (registered) in the field of the BOX NO. column that corresponds to the checked checkbox (step S30). It should be noted here that in the initial settings, the sign "○" representing disclosure-enabled is registered in all the fields of the BOX NO. column in the disclosure-enabled/disabled information table 84, and that the sign "○" is changed to the sign "X" only in the fields of the BOX NO. column that correspond to checked checkboxes. With these operations, the disclosure-enabled/disabled information (either disclosure-enabled or disclosure-disabled) is assigned to each of the selected constituent elements via the allocation areas.

After step S30, it is confirmed whether or not the user has instructed to end the setting, clicking the SETTING END button 90 (step S31). If the user has not instructed to end the setting (NO in step S31), the terminal device 4 waits for another selection by the user of a constituent element (element number) from options of the combo box 88, and upon a selection, sets either the disclosure-enabled or disclosure-disabled for the selected constituent element, using the disclosure-enabled/disabled setting area 80 (steps S28 to S30).

The steps S28 to S30 are repeatedly performed in this way until the disclosure-enabled/disabled information is assigned to each of the selected constituent elements and the disclosure-enabled/disabled information table 84 is completed.

If it is confirmed that the user has clicked the SETTING END button 90 (YES in step S31), the terminal device 4 ends the disclosure restriction setting process, and returns to step S14 in FIG. 7. At this point in time, the completed disclosure-enabled/disabled information table 84 is attached to the corresponding electronic document. It is presumed here that in this example, character strings 86 and 92 and an illustration 94 are selected as constituent elements to be subjected to the disclosure restriction setting process, in the above-described steps S20 through S32, that the selected element No.1 is assigned to the character string 86, the selected element No.2 is assigned to the character string 92, and the selected element No.3 is assigned to the illustration 94, and that the disclosure-enabled/disabled information is assigned to the selected constituent elements as shown in FIG. 12. It should be noted here that the constituent elements that are not selected on the disclosure restriction setting screen 76 are all regarded as disclosure-enabled.

From now on, details of the saving box selection process shown in FIG. 7 will be described with reference to FIGS. 9, 11, and 13.

Figure 13:
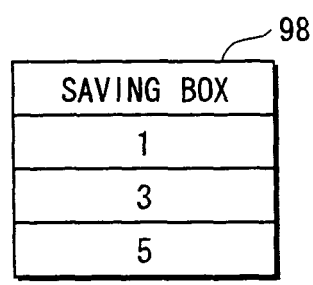
FIG. 13 shows a saving box table with which saving destination boxes for an electronic document have been registered.

In the saving box selection process, first a saving box selection screen 96 as shown in FIG. 11 is displayed on the LCD 18 (FIG. 1), and a saving box table 98 as shown in FIG. 13 is prepared.

When any of the checkboxes 100 are checked by the user on the saving box selection screen 96 (YES in step S36), the corresponding box number is registered with the saving box table 98 (step S38).

Then if it is confirmed that the user has clicked a BOX SELECTION END button 102 (YES in step S40), the saving box selection process is terminated, and the control returns to step S16 in FIG. 7. Here, it is presumed that in this example, boxes No.1, No.3, and No.5 are selected as the saving destinations.

When the saving box selection process is completed, the LCD 18 displays a document transmission instruction screen (not illustrated). If the user clicks a TRANSMIT button (not illustrated) on the document transmission instruction screen (YES in step S16), the electronic document is transmitted to the image forming apparatus having been selected in step S4 together with the saving box table 98 (step S18).

It should be noted here that when an image forming apparatus receives an electronic document, it refers to the saving box table 98, and stores the received electronic document in a box that is identified by the box number registered with the saving box table 98.

<Document Output Process>

The following describes the process of outputting the electronic documents that are stored in the boxes of the fixed memory device 40 in an image forming apparatus as described above. Here, a print output, in which an image of an electronic document is reproduced on paper, will be taken as an example.

Figure 14:
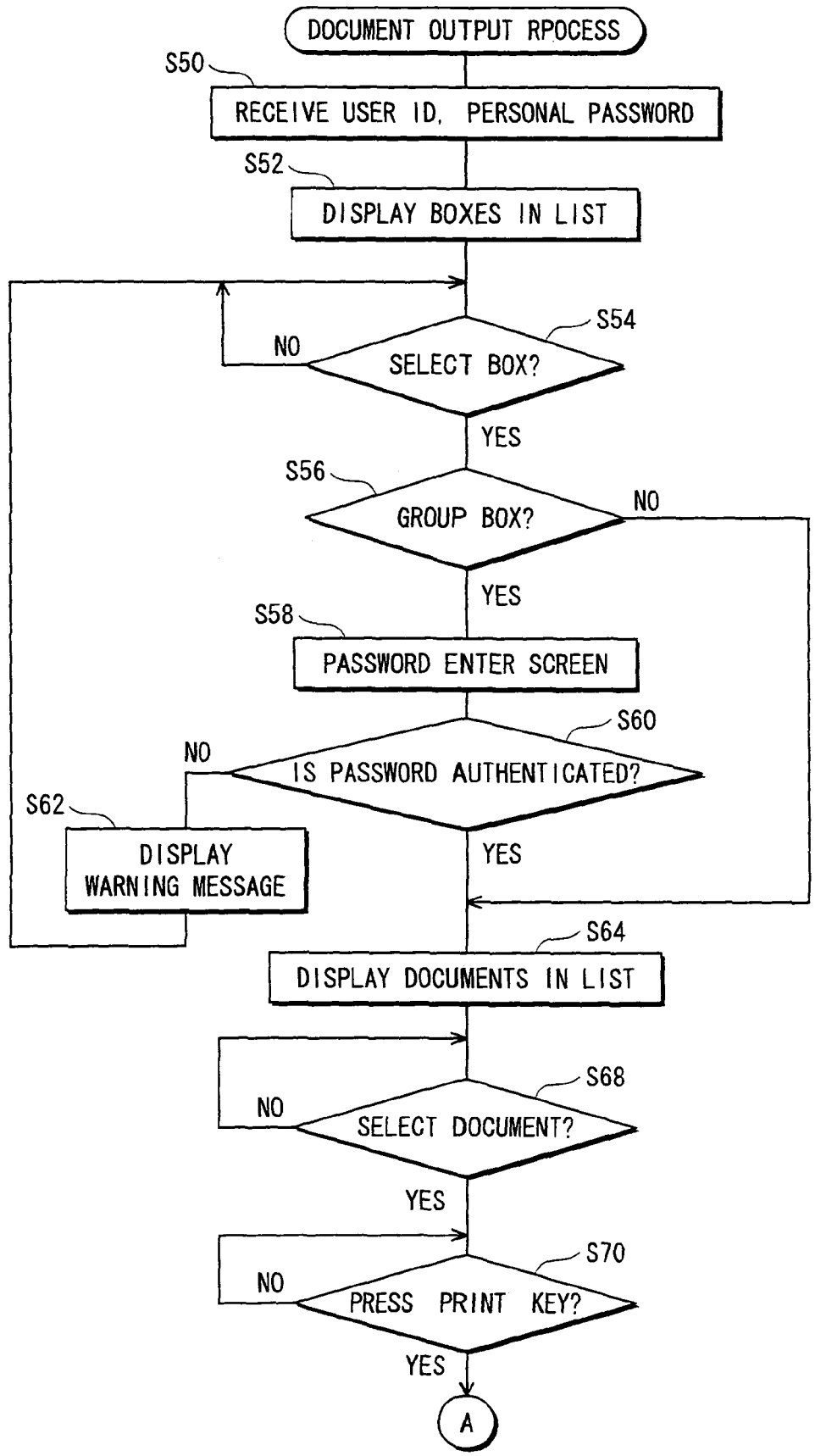
FIG. 14 is part of a flowchart of an electronic document output process.
Figure 15:
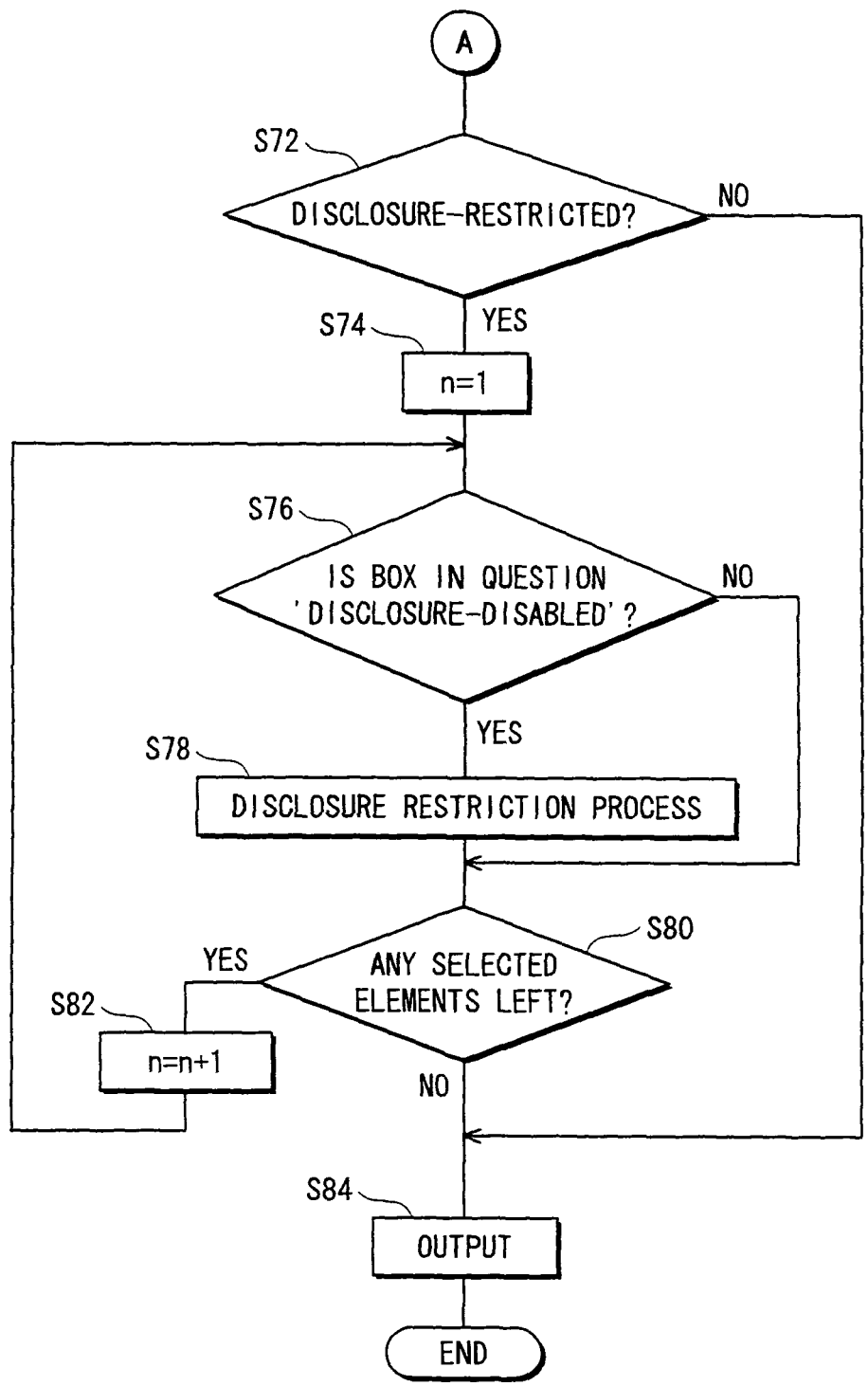
FIG. 15 is part of the flowchart of the electronic document output process.

FIGS. 14 and 15 are flowcharts showing the procedures a program that is run by the control unit 20 (FIG. 2) of the image forming apparatus 6.

The program is activated as the BOX key 60 (FIG. 3) is pressed on the operation panel 34.

After the program is activated, a user ID and personal password reception screen (not illustrated) is displayed on the LCD touch panel 58. Upon receiving a user ID and a personal password (step S50), the numbers assigned to the boxes provided in the fixed memory device 40 are displayed as a list of BOX NO. keys (not illustrated) (step S52). The displayed list includes the box numbers of the group box, public box, and, if there is a private box of a user who was authenticated by the user ID and personal password (namely, a box for which the user has the access right), the private box.

If the user selects a box by specifying one of the listed BOX NO. keys (YES in step S54), the second table 56 (FIG. 6) is referred to so as to judge whether or not the selected box is a group box (step S56).

If the selected box is a group box (YES in step S56), a password enter screen (not illustrated) is displayed on the LCD touch panel 58 (step S58). Upon receiving the password, the second table 56 (FIG. 6) is referred to so as to judge whether or not the received password matches the password of the box selected in step S54 (step S60).

If it is judged that the passwords do not match (NO in step S60), a warning message is displayed on the touch panel 58 to notify the user that the user does not have the access right (step S62), and the control returns to step S54.

On the other hand, if it is judged that the passwords match (YES in step S60), the documents stored in the box that was selected in step S54 are displayed as a list of file names (step S64).

If it is judged that the selected box is not a group box (namely, if it is judged that the selected box is the public box or the private box of the user) (NO in step S56), it indicates that the user has the access right to the box selected in step S54, and the documents stored in the box selected in step S54 are displayed as a list of file names (step S64).

If the user selects a document from the displayed list of documents (YES in step S68), and a PRINT key (not illustrated) displayed on the same screen is pressed (YES in step S70), the control moves to the original document modification process (steps S72 to S82).

First, it is judged whether or not the disclosure-enabled/disabled table 84 (FIG. 12) is attached to the selected electronic document file, and if the result of the judgment is positive (YES in step S72), variable n is set to "1" (step S74), and the control moves to step S76. The variable n is used to identify a selected element number in the disclosure-enabled/disabled table 84.

It is then judged whether or not, in the disclosure-enabled/disabled information table 84, the sign "X" (disclosure-disabled information) is registered in a field of the BOX NO. column for the box in which the electronic document is stored (the box selected in step S54 (FIG. 14)) (step S76).

If it is judged that the sign "X" (disclosure-disabled information) is registered in the field of the BOX NO. column (YES in step S76), the disclosure restriction process such as a conversion into turned letters is performed onto the character string present in the corresponding allocation area of the electronic document (allocation area of the selected element No.1) (step S78). As will be described later, the characters are painted black in the present example.

On the other hand, if it is judged that the sign "○" (disclosure-enabled information) is registered in the field of the BOX NO. column (NO in step S76), step S78 is skipped, and a judgment is made on whether or not there is a selected element that has not been checked on the disclosure-enabled/disabled information (step S80). If it is judged that there is an unchecked selected element (YES in step S80), the variable n identifying a target selected element number is incremented by "1" (step S82), and the control returns to step S76. Then the procedure from step S76 to step S82 is repeated until there is no unchecked selected element (NO in step S80).

After the process is completed with each of the selected elements having been processed (NO in step S80), the control unit 20 outputs the electronic document having been modified in the disclosure restriction process (step S84). If, in step S72, it is judged that the disclosure-enabled/disabled table 84 (FIG. 12) is not attached to the selected electronic document file (NO in step S72), the electronic document is output as it is, not modified in the disclosure restriction process (step S84)

An output destination varies depending on a job specified by the user on the operation panel. In this example, however, a print output has been specified (step S70 (FIG. 14)). Therefore, the control unit 20 outputs the electronic document to the printer 38. Upon receiving the electronic document, the printer 38 reproduces an image of the electronic document onto paper, and output the paper.

<Output Results>

FIG. 16 shows examples of the printouts output as a result of the above described operation. FIG. 16 indicates that the electronic document (file name: document001) was output from each of Box No.1 (private box of User 1), Box No.3 (group box of Group A), and Box No.5 (public box). As described above, among Users 1 to 4, only User 1 is authorized to access Box No.1. As for Box No.3, Users 1 and 3 belonging to Group A are authorized to access, whereas all the Users 1 to 4 can access Box No.5.

Figure 16A:
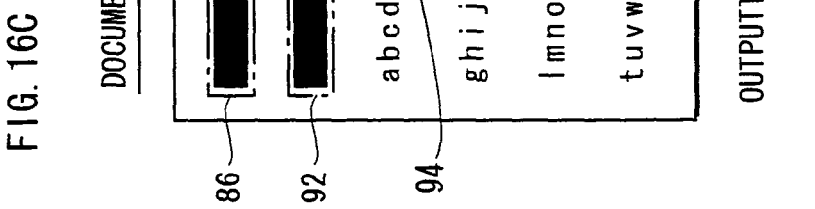
FIGS. 16A to 16C show examples of electronic document output results.

FIG. 16A shows an example of an output from Box No.1. As shown in FIG. 16A, no disclosure restriction is imposed on any of the constituent elements: the character string 86 (selected element No.1); character string 92 (selected element No.2); and illustration 94 (selected element No.3), when they are output from Box No.1. This is because, as the disclosure-enabled/disabled table 84 shown in FIG. 12 indicates, the sign "X" (disclosure-disabled information) is not registered with any field of the box No. 1 for each of the selected elements.

Figure 16B:
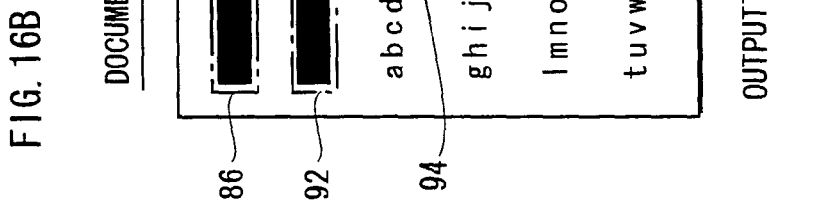

FIG. 16B shows an example of an output from Box No.3. As shown in FIG. 16B, the character string 86 (selected element No.1) and the character string 92 (selected element No.2) are painted black. This is because, as the disclosure-enabled/disabled table 84 shown in FIG. 12 indicates, the sign "X" (disclosure-disabled information) is registered with the fields of the box No.3 for the selected elements No.1 and No.2. However, the illustration 94 (selected element No.3) is printed out as it is since the sign "X" (disclosure-disabled information) is not registered with the field of the box No. 3 for the selected element No.3.

Figure 16C:
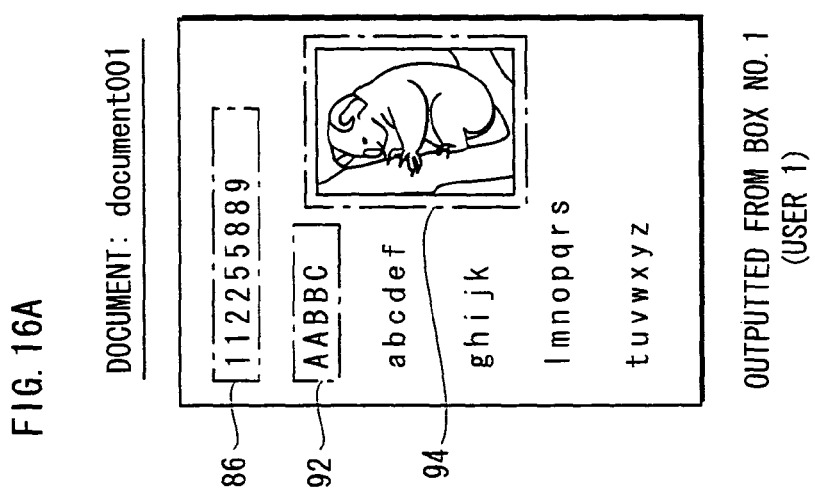

FIG. 16C shows an example of an output from Box No.5. As shown in FIG. 16C, the disclosure restriction is imposed on all the constituent elements: the character string 86 (selected element No.1); character string 92 (selected element No.2); and illustration 94 (selected element No.3), and are painted black when they are output from Box No.5. This is because, as the disclosure-enabled/disabled table 84 shown in FIG. 12 indicates, the sign "X" (disclosure-disabled information) is registered with each field of the box No. 5 for all the selected elements.

Here, User 1 can obtain three different types of printouts for the same electronic document respectively from Boxes No.1, No.3, and No.5 since User 1 has the access right to all of the boxes.

Accordingly, when having a discussion with User 3 belonging to the same Group A on the telephone or the like based on the electronic document, User 1 can obtain a document that is disclosed in the same level as a document obtained by User 3, from Box. No.3 (group box of Group A). This solves the problems described in the SUMMARY OF THE INVENTION section.

In case User 1 would like to discuss with User 2 or User 4 who do not belong to Group A on the telephone or the like, User 1 can obtain a document that is disclosed in the same level as a document obtained by User 2 or User 4, from Box No.5 (public box).

Embodiment Variation

In the above-described embodiment, when an electronic document is output from a box, the electronic document is modified in a predetermined manner depending on the box. In the present variation, when an electronic document is stored in a box, the electronic document is modified in a predetermined manner depending on the box. Further, in the present variation, when an electronic document is copied or transferred from a box to another box, the electronic document is modified in a predetermined manner depending on the box to which the electronic document is copied or transferred. This is because in the present variation, the common electronic document is stored in a plurality of boxes in different forms of disclosure.

The image forming apparatus in the present variation basically has the same construction as the image forming apparatus in the above-described embodiment, except for the timing at which the electronic document is modified. Accordingly, description of the common portions will be omitted or shortened, and the differences will be focused in the following description.

Figure 17:
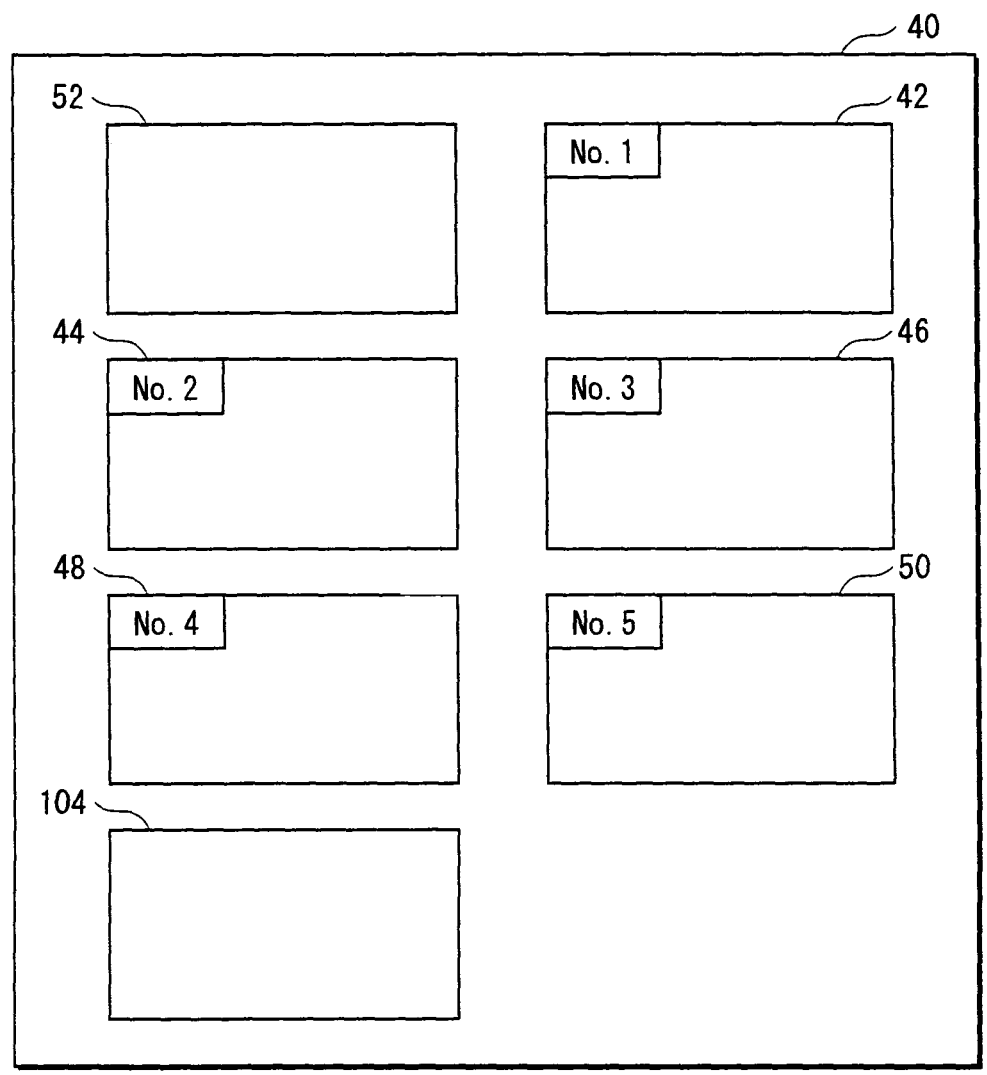
FIG. 17 is a conceptual diagram of storage areas provided in the fixed memory device of the image forming apparatus in a variation to the embodiment.

FIG. 17 is a block diagram showing a storage area of the fixed memory device 40 in the image forming apparatus of the present variation. As shown in FIG. 17, the fixed memory device 40 in the present variation includes an original document storage unit 104, as well as the access management information storage unit 52 and boxes No.1 to No.5.

Figure 18:
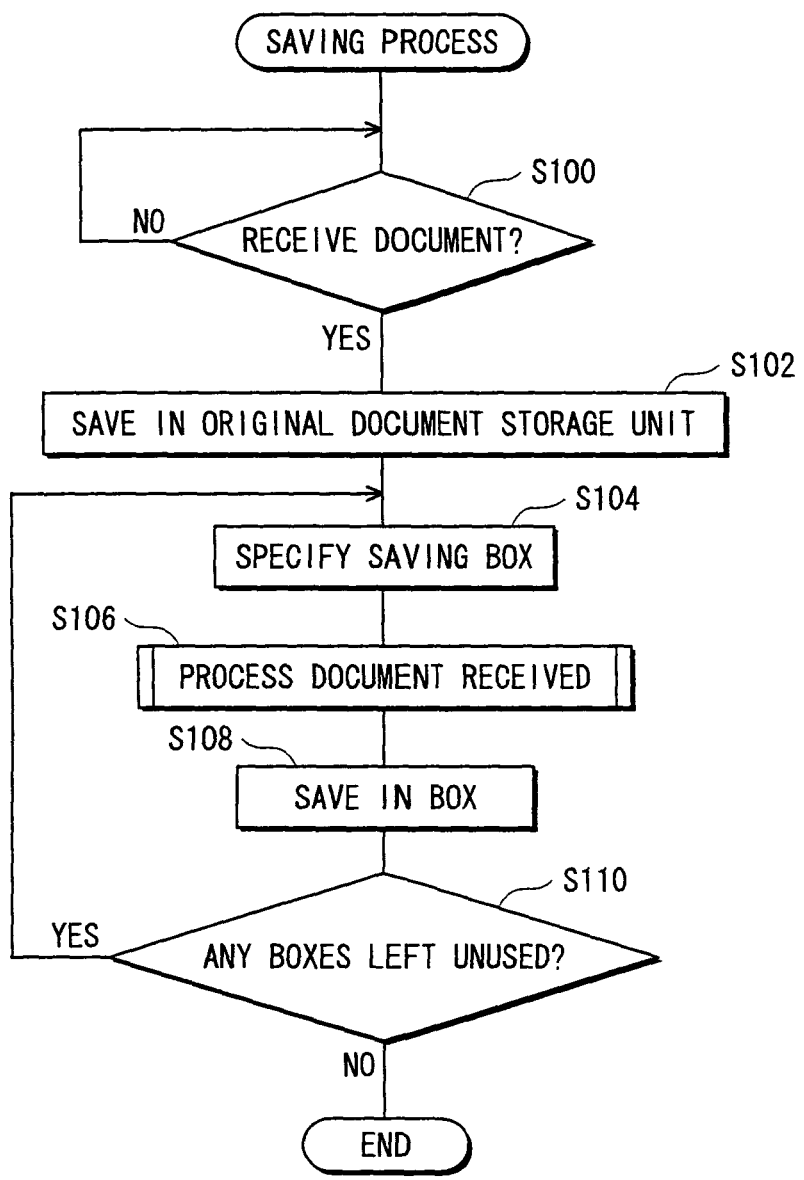
FIG. 18 is a flowchart of an electronic document saving process performed by the image forming apparatus in the variation to the embodiment.

FIG. 18 is a flowchart of the process in which the image forming apparatus (the control unit 20 (FIG. 1)) in the present variation stores an electronic document received from the terminal device 4 (FIG. 1) into a box.

It should be noted here that in the following description of the variation, the same example of electronic document (FIGS. 10, 12, 13) as in the above-described embodiment will be used.

The control unit 20, upon receiving an electronic document (YES in step S100), stores the received electronic document as it is into the original document storage unit 104 (FIG. 17) as an original document (step S102), and stores the received electronic document into each box having box numbers specified in the saving box table 98 (FIG. 13) after modifying the electronic document in a different manner depending on each box (steps S104 to S110).

In these steps, first, the saving box table 98, which is received with the electronic document, is referred to, and the first box number in the table is specified (step S104).

The electronic document is modified in accordance with the specified box number (step S106), and then is stored in the box having the specified box number (step S108). It should be noted here that the electronic document is modified in the same manner as in the original document modification process of the steps S72 to S82 shown in FIG. 15, and the description is omitted here.

After the electronic document is stored in all the boxes having the box numbers specified in the saving box table 98 (NO in step S110), the series of saving processes are ended.

Figure 19:
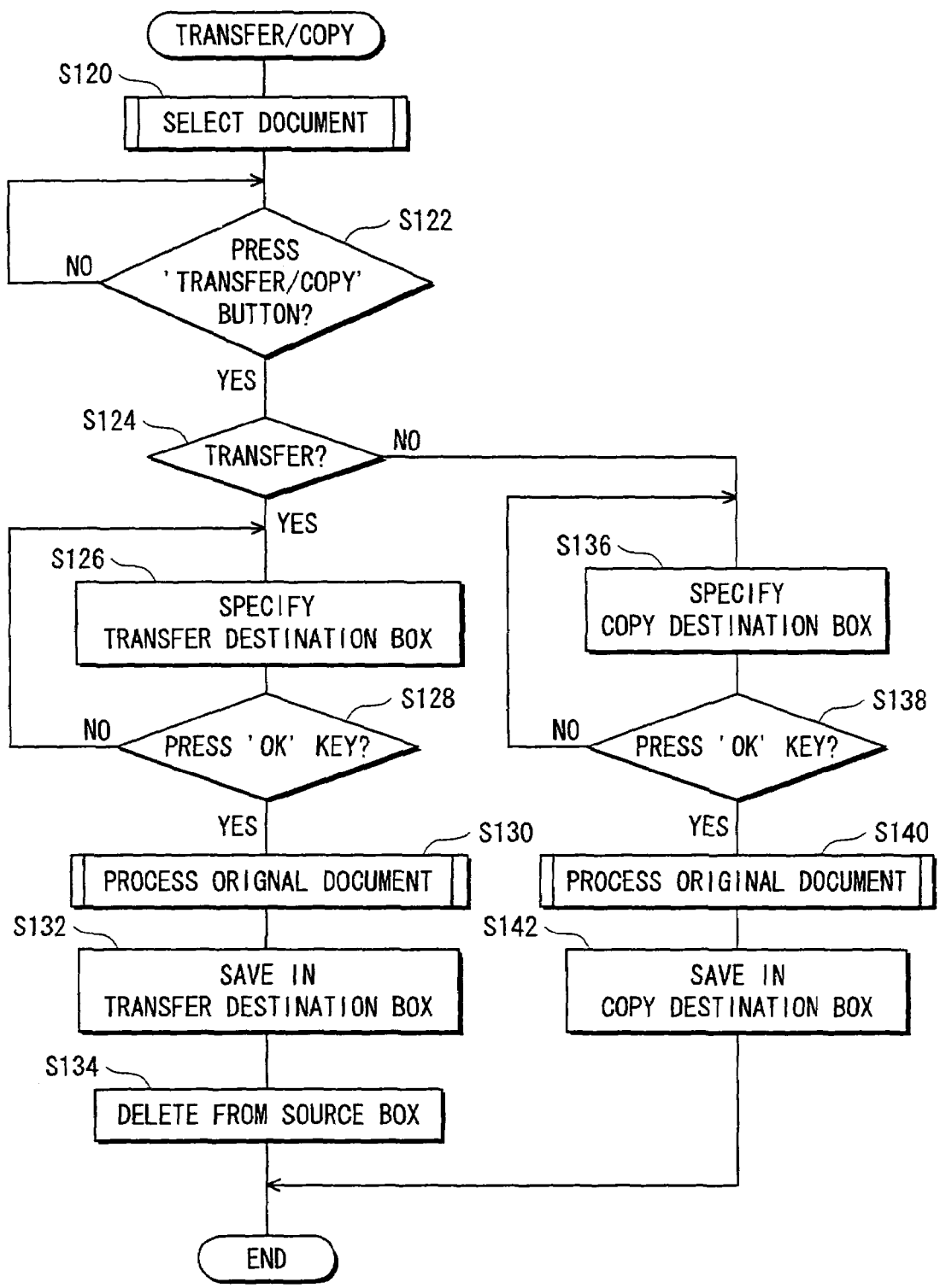
FIG. 19 is a flowchart showing how an electronic document is transferred or copied between boxes by the image forming apparatus in the variation to the embodiment.
Figure 20A:
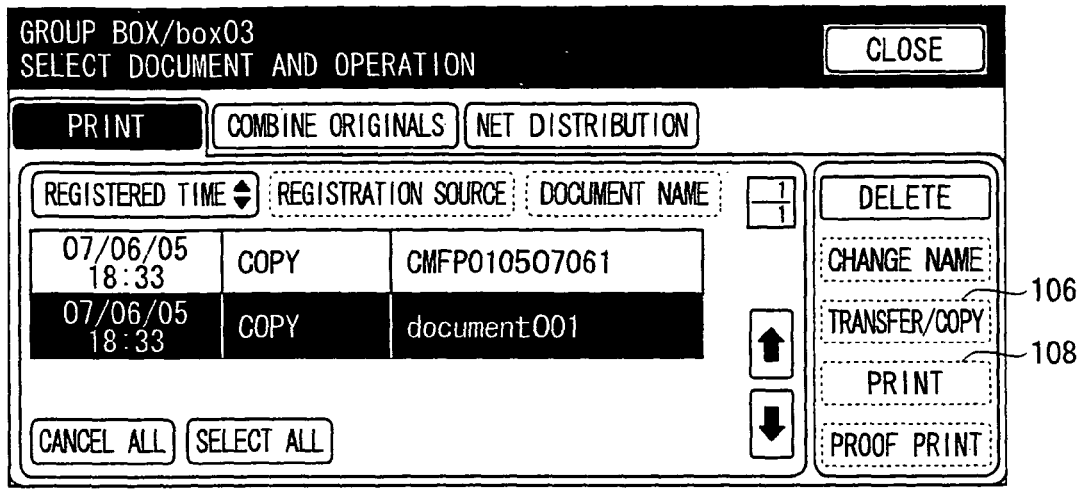
FIGS. 20A to 20C show examples of screens displayed on the liquid crystal touch panel provided in the operation panel, during the transfer/copy of the electronic document.
Figure 20B:
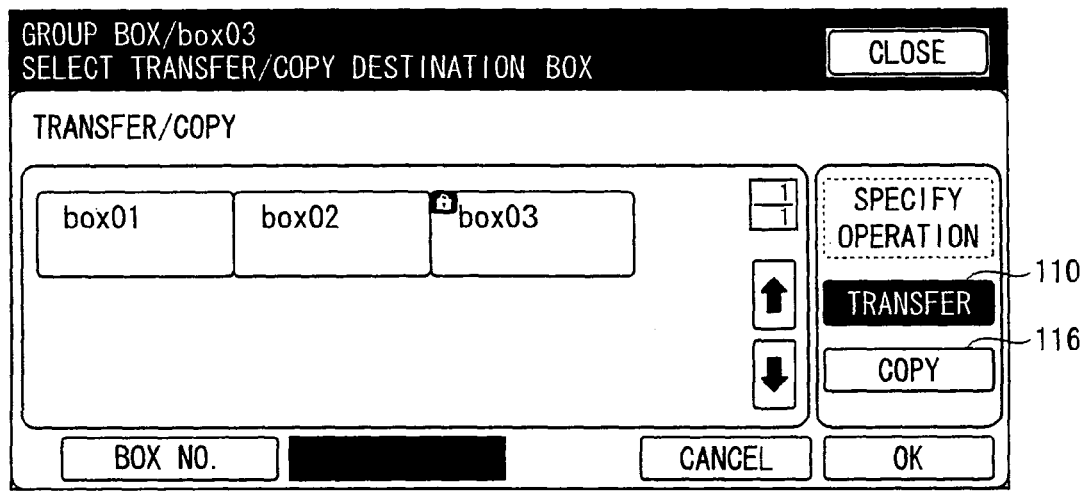
Figure 20C:
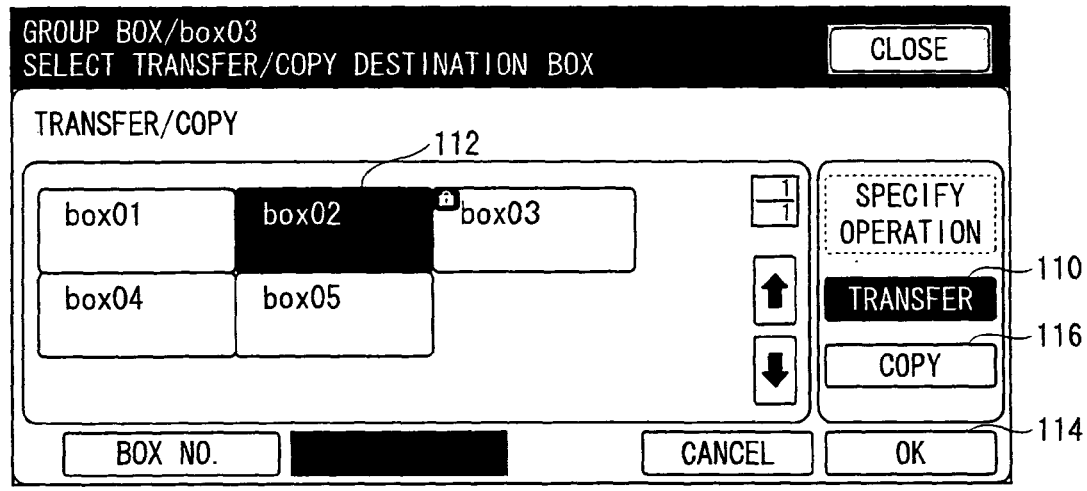

Described next with reference to FIGS. 19 and 20 is how an electronic document is transferred or copied between boxes.

FIG. 19 is a flowchart showing the procedures of a program executed by the control unit 20 (FIG. 2) of the image forming apparatus.

First, the user selects an electronic document to be transferred or copied, on the operation panel 34 (FIGS. 3 and 4) (step S120). This document selection is performed in the same manner as in the procedures of steps S50 to S68 shown in FIG. 14, and thus the description is omitted here.

FIG. 20A shows a screenshot of the LCD touch panel 58 when a document to be transferred or copied has been selected.

When a TRANSFER/COPY key 106 is pressed on the screen shown in FIG. 20A (YES in step S122), the screen switches to the screen in a TRANSFER/COPY mode shown in FIG. 20B. It should be noted here that when a PRINT key 108 is pressed on the screen shown in FIG. 20A (YES in step S70 in FIG. 14), the control moves to the print process (FIG. 15) that has been described earlier.

Next, it is judged whether or not a TRANSFER key 110 was pressed (step S124). If a TRANSFER key 110 is pressed (YES in step S124), a box to which the electronic document is to be transferred is specified (step S126). It is then judged whether or not an OK key 114 was pressed in this state (step S128). If it is judged that the OK key 114 was pressed (YES in step S128), the control moves to the original document modification process (step S130). It should be noted here that as described above, it is presumed that a box02 key 112 was pressed and the Box No.2 was selected as the box to which the electronic document is to be transferred.

In the original document modification process (step S130), an original document (electronic document) is read from the original document storage unit 104 (FIG. 17), and is modified in accordance with the transfer destination box to which the document is to be transferred. Description of the original document modification process is omitted here since it is the same as the process of steps S72 to S82 shown in FIG. 15. It should be noted here that the original document stored in the original document storage unit 104 is kept to be stored therein even though it is used for the modification process.

The electronic document having been modified is stored in the transfer destination box (step S132). The electronic document is deleted from the transfer source box (the box from which the electronic document is transferred) (step S134), and the transfer process ends.

On the other hand, if a COPY key 116 is pressed (NO in step S124), the copy process is performed (steps S136 to S142). Detailed description of the copy process is omitted here since it is almost the same as the transfer process (steps S126 to S132), except that the electronic document is not deleted from the transfer source box (the box from which the electronic document is transferred) (namely, the copy process does not include step S134).

It should be noted here that even if a box password is set in a transfer/copy destination box, the password need not be input.

Now, an explanation will be provided with reference to FIG. 21, using a specific example where the electronic document (file name: document001) is transferred or copied from Box No.3 (group box of Group A) to Box No.2 (private box of User 2).

FIG. 21A shows an electronic document being stored in Box No.3. As shown in FIG. 21A, the character string 86 (selected element No.1) and the character string 92 (selected element No.2) are painted black. This is because, as the disclosure-enabled/disabled table 84 shown in FIG. 12 indicates, the sign "X" (disclosure-disabled information) is registered with the fields of the box No.3 for the selected elements No.1 and No.2. However, the illustration 94 (selected element No.3) is stored in the original state without being painted black since the sign "X" (disclosure-disabled information) is not registered with the field of the box No. 3 for the selected element No.3.

FIG. 21B shows the electronic document being stored in the original document storage unit 104 (FIG. 17). When an electronic document is transferred or copied between boxes, this original electronic document is used to be modified in accordance with the transfer/copy destination box.

FIG. 21C shows the electronic document being stored in Box No.2 as a result of a transfer or a copy. As shown in FIG. 21C, the character string 86 (selected element No.1) and the character string 92 (selected element No.2) are stored as they are without being painted black. This is because, as the disclosure-enabled/disabled table 84 shown in FIG. 12 indicates, the sign "X" (disclosure-disabled information) is not registered with the fields of the box No.3 for the selected elements No.1 and No.2. However, the illustration 94 (selected element No.3) is stored in the state where it is painted black since the sign "X" (disclosure-disabled information) is registered with the field of the box No. 3 for the selected element No.3.

As described above, in accordance with the present variation, the electronic document is stored in a transfer/copy destination box after the disclosure form of the electronic document is modified in accordance with the transfer/copy destination box.

Up to now, the present invention has been described specifically through an embodiment. However, the present invention is not limited to the above-described embodiment, but may be modified variously as the following shows.

(1) In the above-described embodiment, the fixed memory device is provided with a plurality of storage areas (boxes) having a predetermined storage capacity, and when an electronic document is stored in the plurality of boxes in common, the electronic document is stored, in the actuality, in each box (storage area) (namely, for example, three electronic documents are stored in three boxes, respectively).

However, the storage areas may not necessarily be allocated in the actuality for each box to store the electronic document. That is to say, when one electronic document is to be managed using a plurality of boxes, one electronic document may be stored in the actuality, and the electronic document may be correlated with the plurality of boxes (box numbers). The correlation may be made with use of a management table or the like.

Accordingly, in this specification of the invention, management of an electronic document with use of boxes includes the following cases: (i) a plurality of electronic documents are stored respectively in a plurality of storage areas that are allocated in the actuality; or (ii) one electronic document is stored in the actuality, and is correlated with a plurality of boxes (box numbers), using a management table or the like.

(2) In the above-described embodiment, the disclosure-enabled/disabled information is attached to each constituent element of the electronic document via the allocation areas of the constituent element (FIG. 12 and the like). However, not limited to this construction, the constituent elements may be directly correlated with the disclosure-enabled/disabled information. That is to say, for example, the constituent elements may be identified by IDs attached to the constituent elements, or may be identified by layout information of the electronic document (the layout information indicates, for example, "from $B^{th}$ character in the $A^{th}$ row to $y^{th}$ character in the $X^{th}$ row")

(3) In the above-described embodiment, the constituent elements attached with the disclosure disabled information are painted black in the turned-letter process. However, the turned-letter process is not limited to this. For example, the characters in the constituent elements with the disclosure disabled information may be replaced with a predetermined sign (for example "○" or "X"). Alternatively, the characters in the constituent elements with the disclosure disabled information may be deleted, leaving spaces there. Any modification will do in so far as the constituent elements with the disclosure disabled information are not disclosed to user who receive an electronic document including the constituent elements.

The user may be allowed to select the type of the turned letters. More specifically, the disclosure restriction setting screen shown in FIG. 10 may display some buttons (for example, a PAINT-BLACK button, a SIGN ○ button, a SIGN X button, and a SPACE button) so that the user can select one among some types of turned letters. The timing at which the user selects the turned letter type may be immediately after the user has selected a constituent element (immediately after it is judged as YES in step S28 shown in FIG. 8) or the like. The signs or the like that are to replace the character constituting the constituent elements with the disclosure disabled information may be stored preliminarily in the ROM 24 (FIG. 2) of the control unit 20.

(4) In the above-described embodiment, the character strings 86, 92 and illustration 94 (FIG. 10 and the like) are provided as examples of constituent elements to which the disclosure-enabled/disabled information is attached. However, not limited to these, the disclosure-enabled/disabled information may be attached to any unit of constituent elements. For example, a character string and an illustration may be combined into a single constituent element. As another example, one whole page in an electronic document composed of a plurality of pages may be regarded as a single constituent element.

(5) In the above-described embodiment, the terminal device performs the disclosure restriction setting process (step S12 (FIG. 7)) onto an electronic document stored in the terminal device, and stores the electronic document having been subjected to the disclosure restriction setting process into the fixed memory device of the image forming apparatus. However, not limited to this, the terminal device may read an electronic document from the image forming apparatus, perform the disclosure restriction setting process (step S12 (FIG. 7)) onto the read electronic document, and return (re-save) the electronic document having been subjected to the disclosure restriction setting process to the image forming apparatus.

(6) In the above-described embodiment, the electronic document having been subjected to the disclosure restriction setting process (step S12 (FIG. 7)) is output in a print form. However, the output form of the electronic document is not limited to this. For example, the electronic document may be: transmitted by facsimile; transmitted to a terminal device or another image forming apparatus via the network; transmitted as an attachment to an e-mail; or displayed on the LCD of the image forming apparatus itself.

(7) The programs whose procedures are shown in the flowcharts of FIGS. 7 to 9, FIGS. 14 to 15, and FIGS. 18 to 19 may be recorded on various computer-readable recording mediums such as: magnetic tape; and a magnetic disk such as a flexible disk; an optical recording medium such as DVD-ROM, DVD-RAM, CD-ROM, CD-R, MO, or PD. The present invention may be produced or transferred in the form of the above-mentioned recording medium, or may be sent or supplied in the form of the above-mentioned program via: one of various wired/wireless networks including the Internet; an electric communication line or the like.

With the above-stated construction, for example, in case the user is a member of the user group, the user can obtain the electronic document from two boxes to which the user and the user group respectively have the access right. That is to say, the user can obtain the electronic document with a predetermined disclosure range permitted for the user group, as well as the electronic document with a predetermined disclosure range permitted for the user itself. This solves the above-described inconvenience which would occur when, for example, the user has a meeting with another member of the user group based on the electronic document.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An electronic document management device comprising:
    an electronic document storage unit that includes a plurality of boxes for storing electronic documents, each of which documents includes one or more constituent elements, each constituent element being attached with either disclosure-enabled information or disclosure-disabled information, each disclosure-enabled information or disclosure-disabled information designating whether each constituent element is to be disclosed or not, depending on the box in which the electronic document is to be stored, wherein an access right having a different level is assigned to each of the plurality of boxes;
    a document selection unit that accepts user selection of an electronic document stored in one of the plurality of boxes;
    a judgment unit that judges if each of the constituent elements of the selected electronic document is attached with disclosure-disabled information for the box storing the selected electronic document; and
    a modifying unit operable to modify the constituent element of the selected electronic document that is judged by the judgment unit being attached with the disclosure-disabled information for the box storing the selected electronic document, so as not to be disclosed.

2. The electronic document management device of claim 1, further comprising:
    an output instruction receiving unit operable to receive an instruction to output the electronic document that is stored in one of the plurality of boxes; and
    an output unit operable to output the electronic document from said one of the plurality of boxes in accordance with the received instruction, wherein
    when the output unit outputs the electronic document from said one of the plurality of boxes, the modifying unit modifies each constituent element of the electronic document that is attached with the disclosure-disabled information.

3. The electronic document management device of claim 1, wherein
    the modifying unit modifies each constituent element of the electronic document that is attached with the disclosure-disabled information when the electronic document is stored in one of the plurality of boxes.

4. The electronic document management device of claim 3, further comprising:
    an original document storage unit storing the electronic document that has not been modified; and
    a transfer/copy instruction receiving unit operable to receive an instruction to transfer or copy the electronic document from one of the plurality of boxes to another one of the plurality of boxes, wherein
    when the transfer/copy instruction receiving unit receives the instruction to transfer or copy the electronic document, the modifying unit modifies, with respect to the electronic document stored in the original document storage unit, each constituent element attached with the disclosure-disabled information in accordance with said another one of the plurality of boxes, and stores the electronic document after the modification to said another box.

5. The electronic document management device of claim 1, further comprising a non-transitory recording medium recording therein a program which causes the electronic document management device to execute:
    displaying the selected electronic document on a display unit;
    receiving a notification that a constituent element of the displayed electronic document has been selected; and
    assigning either disclosure-enabled information or disclosure-disabled information to the selected constituent element, in correspondence with each box in which the electronic document is stored.

6. An electronic document management method comprising:
    storing electronic documents in a plurality of boxes, each of which documents includes one or more constituent elements, each constituent element being attached with either disclosure-enabled information or disclosure-disabled information, each disclosure-enabled information or disclosure-disabled information designating whether each constituent element is to be disclosed or not, depending on the box in which the electronic document is to be stored, wherein an access right having a different level is assigned to each of the plurality of boxes;
    accepting a user selection of an electronic document stored in one of the plurality of boxes;
    judging if each of the constituent elements of the selected electronic document is attached with disclosure-disabled information for the box storing the selected electronic document; and
    modifying the constituent element of the selected electronic document that is judged to be attached with the disclosure-disabled information for the box storing the selected electronic documents, so as not to be disclosed.

7. A non-transitory recording medium recording therein a program which causes a computer to execute the steps of:

storing electronic documents in a plurality of boxes each of which documents includes one or more constituent elements, each constituent element being attached with either disclosure-enabled information or disclosure-disabled information, each disclosure-enabled information or disclosure-disabled information designating whether each constituent element is to be disclosed or not depending on the box in which the electronic document is to be stored, wherein an access right having a different level is assigned to each of the plurality of boxes;

accepting a user selection of an electronic document stored in one of the plurality of boxes;

judging if each of the constituent elements of the selected electronic document is attached with disclosure-disabled information for the box storing the selected electronic document; and modifying the constituent element of the selected electronic document that is judged to be attached with the disclosure-disabled information for the box storing the selected electronic documents so as not to be disclosed.

\* \* \* \* \*